US007226632B2

United States Patent
Wong et al.

(10) Patent No.: US 7,226,632 B2
(45) Date of Patent: Jun. 5, 2007

(54) METHOD FOR MAKING RICE CONGEE

(75) Inventors: Janet Wong, Hong Kong (CN); Maria Ho, Hong Kong (CN)

(73) Assignee: Compagnie Gervais Danone, Levallois-Perret (FR)

( * ) Notice: Subject to any disclaimer, the term of this patent is extended or adjusted under 35 U.S.C. 154(b) by 352 days.

(21) Appl. No.: 10/480,850

(22) PCT Filed: Jun. 13, 2001

(86) PCT No.: PCT/EP01/07476

§ 371 (c)(1),
(2), (4) Date: Dec. 15, 2003

(87) PCT Pub. No.: WO02/100190

PCT Pub. Date: Dec. 19, 2002

(65) Prior Publication Data

US 2004/0151819 A1    Aug. 5, 2004

(51) Int. Cl.
*A23L 1/10* (2006.01)

(52) U.S. Cl. ............... 426/618; 426/518; 426/520

(58) Field of Classification Search ............ 426/618, 426/518, 520
See application file for complete search history.

(56) References Cited

U.S. PATENT DOCUMENTS 3,961,087 A   6/1976   Zukerman ............... 426/262
4,585,664 A   4/1986   Kohlwey ................ 426/619

FOREIGN PATENT DOCUMENTS

| EP | 0 461 284  | 12/1991 |
| JP | 04 108349  | 4/1992  |
| JP | 04 166044  | 6/1992  |

OTHER PUBLICATIONS

Database WPI, Section Ch, Week 200050, Derwent Publications Ltd., London, GB; AN 2000-547959. XP002195762.
Database WPI, Section Ch, Week 199316, Derwent Publications Ltd., London, GB; AN 1993-126448. XP002195763.
Database WPI, Section Ch, Week 199230, Derwent Publications Ltd., London, GB; AN 1992-246290. XP002195775.

*Primary Examiner*—Helen Pratt
(74) *Attorney, Agent, or Firm*—Morgan Lewis & Bockius LLP

(57) ABSTRACT

The invention relates to a method for making rice congee wherein crushed rice is chilled prior to addition to boiling water.

10 Claims, No Drawings

METHOD FOR MAKING RICE CONGEE

The invention relates to the making of rice congee, in particular frozen rice congee.

Congee is a rice gruel commonly eaten at breakfast in many Asian countries.

Home-made congee is customarily prepared by boiling rice in a large quantity of water or broth (generally about 1 part of rice grain for 20 parts of water), resulting in a soup or porridge with a smooth and creamy texture. This takes generally at least 1–1½ hours of slow cooking. A variety of ingredients, including meat, fish, shellfish, vegetables and seasonings, can be cooked with the rice or added to the congee before serving.

Due to its relatively long time of cooking, congee is not convenient to prepare at home for everyday breakfast. Thus it appears useful to provide industrially prepared frozen congee that can be eaten after only a few minutes of thawing in a microwave oven.

However, the long cooking period necessary to reach the desired texture is also a drawback for the industrial preparation of congee. Further, frozen congee forms a block, which is problematic to thaw homogeneously in a short time. This can result in a deterioration of the texture and the mouthfeel of the ready-to-eat product.

It is therefore an object of the present invention to make the industrial preparation of congee easier and less-time consuming, and to provide frozen congee that can be easily and quickly thawed, while retaining the organoleptic properties of freshly-made congee.

The present invention provides a method for preparing rice congee, wherein said method comprises:

a) providing crushed rice wherein 60 to 70% of the particles have a diameter of 0.15 to 0.2 cm, 15–20% of the particles have a diameter of less than 0.1 cm, and 5–10% of the particles are in powdery state (i.e have a diameter of less than 0.01 cm).

b) chilling said crushed rice at a temperature of 3 to 5° C.;

c) adding directly the chilled rice to 16.5 to 20, preferably 17 to 18 parts by weight of boiling water for 1 part of rice, and simmering it for about 30 minutes to 1 hour, preferably from about 30 minutes to 45 minutes.

Preferably, the crushed rice is obtained from long grain rice, for instance long grain rice from Thailand or South China.

According to a preferred embodiment of the invention, the crushed rice is mixed, prior chilling, with a mixture of oil and salt, at a weight ratio of from 0.02 to 0.8 parts, preferably of from 0.04 to 0.06 parts of oil, and of from 0.05 to 0.5 parts, preferably of from 0.1 to 0.2 parts of salt for 1 part of rice;

Preferably, vegetable oil is used in this embodiment of the process of the invention. This include for instance, peanut oil, olive oil,. coconut oil, sunflower seed oil, soybean oil, sesame oil, and corn oil and mixtures thereof. Preferred oils are corn oil, soybean oil, and mixtures thereof.

According to a preferred embodiment of the invention, bean curd sheet or powdered milk or mixtures thereof can be added at step c) at a weight ratio of from 0.01 to 0.1 parts, preferably of from 0.04 to 0.06 parts for 1 part of rice. This provides an increase of the protein content, thus enhancing the nutritional value of congee, and also results in a further improvement of texture and mouthfeel. Appropriate seasoning can also be added at step c). Any seasoning usually employed in the preparation of congee may also be used in the process of the invention.

According to a preferred embodiment of the invention, said seasoning include monosodium glutamate, generally at a weight ratio of from 0.01 to 0.1 parts, preferably of from 0.02 to 0.05 parts for 1 part of rice.

The plain congee thus obtained can further be completed, in the same way as traditional congee, with ingredients such as meat (for instance pork, beef or chicken), fish, shellfish, shrimps, vegetables, mushrooms, etc.

Prior to freezing, congee is packaged in an appropriate container. Preferably, one will choose a container suitable for use in a microwave oven, such as a microwave bowl, designed for facilitating the heat transfer, and thus allowing a quick thawing and heating of the congee.

The freezing is performed as promptly as possible, according to the classical methods of quick freezing. It is preferably carried out at −10° C. to −20° C., preferably at −10° C. to −15° C.

The packaged frozen congee can be stored at a temperature below −18° C. for several months.

The invention also relates to congee obtainable by the process of the invention, in particular frozen congee.

The frozen congee of the invention can be quickly and easily thawed by the final consumer, providing a ready-to-eat congee having the aspect texture and taste of freshly prepared congee.

The congee of the invention has the same organoleptic properties as the freshly prepared congee of the prior art. Further, in contrast with the congee of the prior art which does not withstand freezing/thawing, the congee of the invention keeps its organoleptic properties after freezing and thawing.

The present invention will further be described by the examples below. It is noted that this examples are given only for illustration and are not intended for limiting the invention.

EXAMPLE 1

Preparation of Plain Congee

1. Formulation

The ingredients are listed in Table I below:

TABLE I

| Ingredients | |
|---|---|
| Water | 69 kg–70 kg |
| Rice | 4 kg |
| Oil | 0.2 kg |
| Bean Curd Sheet | 0.2 kg |
| Salt | 0.6 kg |
| Monosodium glutamate | 0.04 kg |
| Sugar | 0.03 kg |

2. Rice Pre-treatment

Long grain rice is washed and drained, then crushed in a wheat crusher to the granular size shown in Table II below:

TABLE II

| Large size (0.15 cm to 0.2 cm) | Medium size (<0.1 cm) | Fine size (powder) |
|---|---|---|
| 60%–70% | 15%–20% | 5%–10% |

Salt and oil are added to the crushed rice and the mixture is placed in chiller for 1 hour to reach 4° C.

3. Process

The water is brought to the boil, and the chilled rice/oil/salt mixture and the bean curd sheet are added. When the water boils again, the heat is turned down, so as to keep the water simmering, i.e. at a temperature of about 80–85° C., for 30 to 45 minutes.

The congee is then portioned into microwaveable PET (polyoxyethylene) bowls (about 300 g/bowl)

The bowls are put in a blast freezer, for about 1 hour, till center temperature reach −10° C. or below. A lid is placed on each bowl.

The bowls are stored at −18° C.

EXAMPLE 2

Mushroom and Chicken Congee

Plain congee is prepared and cooked as disclosed in example 1 above.

The ingredients listed in Table III below are processed as follows:

TABLE III

| Ingredients | % |
| --- | --- |
| Chicken | 60.4 |
| Dried mushrooms | 35 |
| Salt | 1.5 |
| Pepper | 0.5 |
| Ginger | 1.1 |
| Green onion | 1.5 |

Chicken meat is thawed, cut in slices, and marinated for 30 min. with salt, pepper, ginger and green onion, then cooked by steaming till temperature at the center reaches 100° C.

Mushrooms are washed, blanched, and cut in slices.

These ingredients are added to the plain congee (50 g of mixture of ingredients/300 g of cooked congee).

The resulting product is portioned into PET bowls, frozen, and stored at −18° C. as described in Example 1 above.

The invention claimed is:

1. A method of making rice congee comprising:
   a) providing crushed rice wherein 60 to 70% of the particles have a diameter of 0.15 to 0.2 cm, 15 to 20% of the particles have a diameter of less than 0.1 cm, and 5–10% of the particles are in a powdery state;
   b) chilling said crushed rice at a temperature of 3 to 50° C.;
   c) combining the chilled rice with boiling water in an amount between 16.5 and 20 parts by weight water per 1 part rice, and
   d) simmering the combination for between 30 minutes and 1 hour.

2. The method of claim 1 wherein the amount of boiling water combined with the chilled rice in step c) is between 17 and 18 parts water per 1 part rice.

3. The method of claim 1 further comprising admixing oil and salt with the crushed rice prior to the chilling of step b) wherein oil is added in an amount between 0.01 and 0.1 parts by weight oil per 1 part rice and salt is added in an amount between 0.05 and 0.5 parts by weight salt per 1 part rice.

4. The method of claim 3 wherein the amount of oil admixed with the crushed rice is between 0.04 and 0.06 parts by weight oil per 1 part rice.

5. The method of claim 4 wherein the amount of salt admixed with the crushed rice is between 0.1 and 0.2 parts by weight salt per 1 part rice.

6. The method of claim 1 further comprising the addition of bean curd sheet and/or powdered milk together with the boiling water addition in step c), wherein the bean curd sheet, powdered milk or combination of bean curd sheet and powdered milk is added in an amount between 0.01 and 0.1 parts by weight of added material per 1 part chilled rice.

7. The method of claim 6 wherein the amount of added material is between 0.04 and 0.06 parts by weight added material per 1 part chilled rice.

8. The method of claim 1 further comprising the addition of monosodium glutamate together with the boiling water addition in step c), wherein the monosodium glutamate is added in an amount between 0.01 and 0.1 parts by weight of monosodium glutamate per 1 part chilled rice.

9. The method of claim 8 wherein the amount of monosodium glutamate is between 0.02 and 0.05 parts by weight added material per 1 part chilled rice.

10. The method of claim 1 further comprising the addition of step e) comprising freezing the rice congee of step d).

* * * * *